United States Patent [19]

Martin, Jr.

[11] 4,221,274
[45] Sep. 9, 1980

[54] LIFT TRUCK CAB WITH MOVABLE BACK WALL PORTION

[76] Inventor: Robert P. Martin, Jr., 12576 Lake Ave., Lakewood, Ohio 44107

[21] Appl. No.: 11,518

[22] Filed: Feb. 12, 1979

[51] Int. Cl.² .............................................. B62D 27/06
[52] U.S. Cl. ............................... 180/69 R; 180/89.14; 296/190
[58] Field of Search ............... 180/89.12, 89.13, 89.14, 180/89.16, 89.17, 89.18, 69 R, 69 C; 296/190, 35 R; 187/9 R

[56] References Cited

U.S. PATENT DOCUMENTS 3,866,969  2/1975  Sandrock ............................ 296/190
4,079,985  3/1978  Martin .................................. 296/190

Primary Examiner—John J. Love
Assistant Examiner—John A. Carroll
Attorney, Agent, or Firm—Pearne, Gordon, Sessions

[57] ABSTRACT

A rear engine lift truck is provided with an operator cab having a back wall portion fixed to a hinged engine hood for concurrent movement therewith apart from the remaining cab structure. The hood is hinge-mounted at its forward end within the cab interior wherein upward movement of the hood provides unobstructed rear access to the engine compartment, the movable back wall portion swinging into the cab interior.

8 Claims, 5 Drawing Figures

FIG. 3
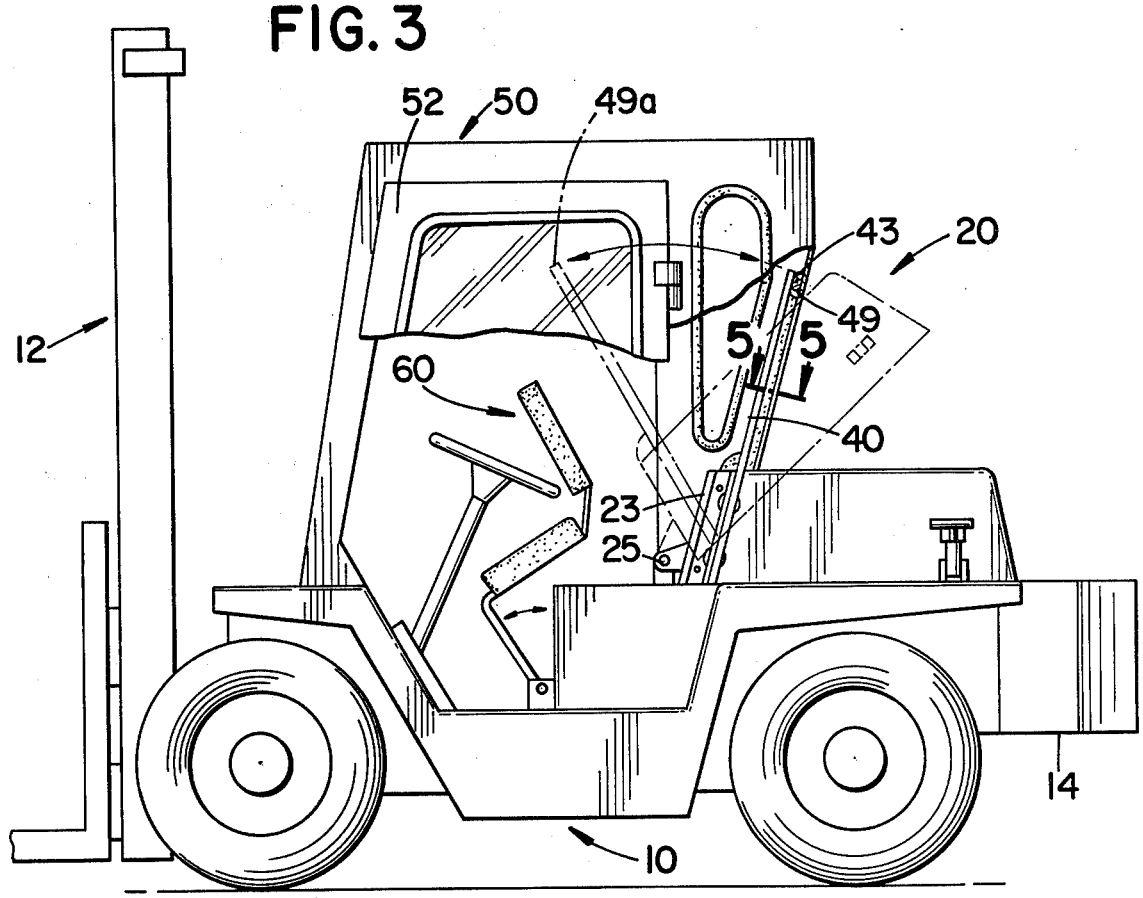
FIG. 4
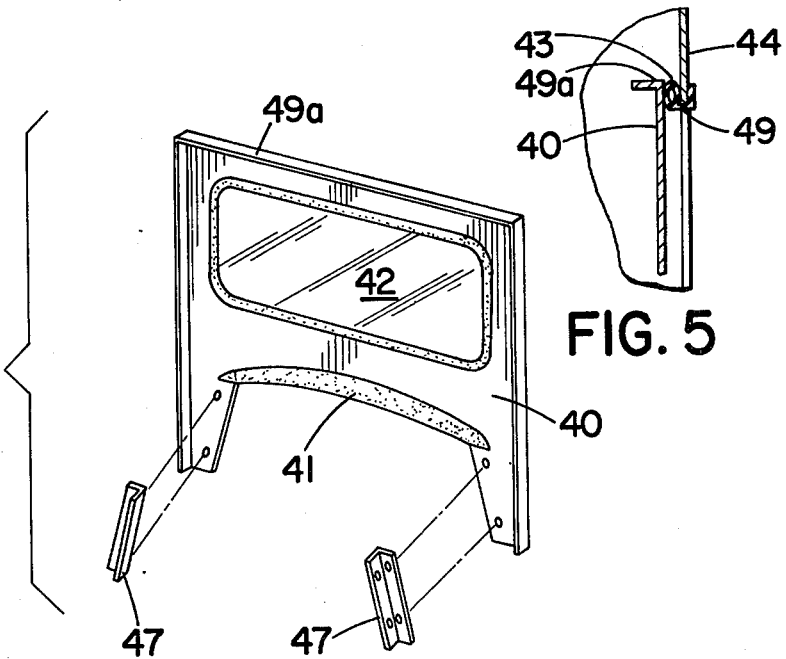
FIG. 5

LIFT TRUCK CAB WITH MOVABLE BACK WALL PORTION

BACKGROUND OF THE INVENTION

This invention relates in general to vehicle cabs, and in particular to an operator's cab for a rear engine lift truck, the cab having a back wall which permits full raising of a rear engine lift truck hood hinged at its foward end.

Rear engine lift trucks are often provided with a rearwardly located engine covering hood hinged at its forward end, wherein raising of the hood provides rear access to the engine compartment. Typically, the longitudinal extent of the hood places its hinged forward end immediately behind the lift truck operator's seat.

The provision of an operator enclosing cab for such a rear engine lift truck necessitates that the back wall of such a cab accommodate raising and lowering of the rear engine hood.

One means for accommodating such rear engine hood movement includes the provision of a cab with a fixed, continuous back wall located forward of and adequately spaced from the hinged front end of the hood. Such a back wall would most probably be against the back of the operator's seat, resulting in small, cramped cab interior.

It is the purpose of the present invention to provide a spacious cab for a rear engine lift truck, the cab having its back wall spaced well behind the operator's seat while still accommodating full raising and lowering of the rear engine hood for access to the engine compartment.

SUMMARY OF THE INVENTION

The present invention advantageously provides a rear engine lift truck cab having a back wall portion fixed to and concurrently movable with a rear engine hood hinged at its forward end, the forward end of the hood extending into the cab interior forward of the cab back wall. With the hood in its closed position, the movable back wall porton sealingly engages at its periphery with a fixed back wall portion to provide a continuous, generally draft-free, noise limiting back wall well spaced behind the operator's seat to advantageously provide a spacious cab interior. Upon raising the engine hood to an open condition for unobstructed rear access to the engine compartment, the movable back wall portion fixed to the hood is displaced from its normal closed position and swings into the cab interior.

BRIEF DESCRIPTION OF THE DRAWINGS

FIG. 3 is a left side elevation view of the operator's cab illustrated in FIG. 1, with portions cut away, the rear engine hood of the associated lift truck being illustrated in phantom in a raised or open condition;

FIG. 4 is a perspective view of the movable back wall portion, with mounting bracket as illustrated in FIGS. 1 through 3; and FIG. 5 is a cross section view taken along line 5—5 of FIG. 3.

DETAILED DESCRIPION OF THE PREFERRED EMBODIMENT

Figure 1:
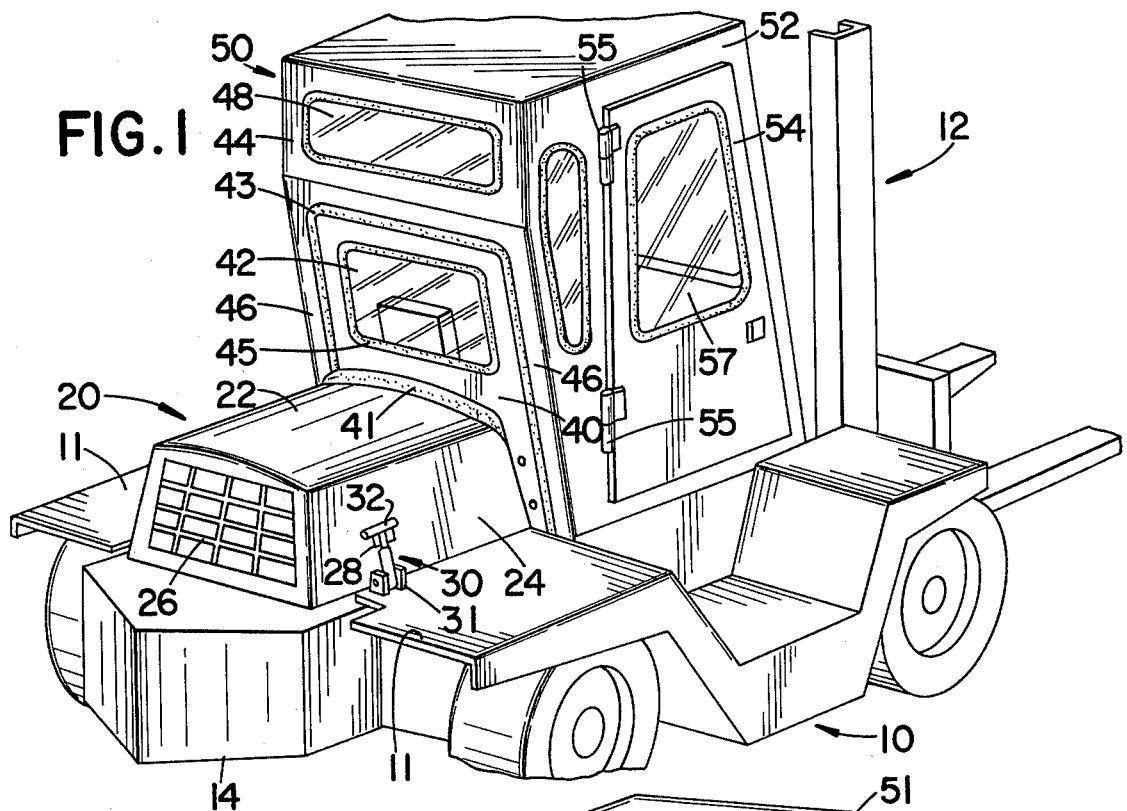
FIG. 1 is a rear, perspective view of a rear engine lift truck including an operator's cab in accordance with the invention, the rear engine hood of the lift truck being illustrated in a lowered or closed condition.

With reference to FIG. 1, there is disclosed a rear engine lift truck having a wheel-supported lift truck body 10. At the front end of the body 10 there is mounted a hydraulically actuated fork lift machanism 12 of the conventional type, while the rearward end of the body 10 includes a counterweight 14, also of the conventional type. Located at the rearward end of the lift truck body 10 is an engine-covering, longitudinally extending hood 20 of sheet metal or the like. The hood 20 includes a flat, normally horizontal hood top 22, a pair of generally vertically extending, generally parallel sides 24 (only one shown in FIG. 1) and a rearwardly facing grill 26 for passing radiator cooling air drawn through the engine-containing compartment located under the hood 20 in a conventional manner. The hood 22 is held in its lowered or closed position as illustrated in FIG. 1 by a pair of spring-loaded, hold down hood latches 30 (only one shown) having their base portions 31 fixed to rear fender portions 11 of the body 10, while their upper, spring-loaded ends 32 engage hold down flanges 28 fixed to the rearward ends of the sides 24 of the hood 20. These spring-loaded hold down hood latches 30 are of conventional design and permit rapid latching and unlatching of the hood 20.

Mounted on top of the lift truck body 10 is a cab 50 for substantially totally enclosing the lift truck operator station. As illustrated in FIG. 1, the cab 50 includes a pair of sidewalls or side panels 52, at least one of which is provided with a movable door 54 mounted at its rearward edge to the sidewalls 52 by appropriate hinges 55, the door 54 swinging outward from the side panels 52 to provide operator access and egress. The cab 50 further includes a back wall having a fixed back wall upper portion 44 with a centrally located window or light 48. Extending downward from opposed ends of the fixed back wall upper portion 44 are a pair of fixed back wall leg portions 46 each abutting and connected to or integrally formed with the respective rearward edges of the cab sidewalls 52, as illustrated. The lower edge of the fixed back wall upper portion 44 and the inwardly opposed edges of the fixed back wall leg portions 46 provide a generally rectangular aperture which receives the forward end of the hood 20 and mates with a movable back wall or back panel portion 40 sealingly fixed to the hood 20 in a manner to be subsequently described.

With the hood 20 in its closed position, as illustrated in FIG. 1, the movable back wall portion 40 abuts the fixed rear wall portions 44, 46 and is generally parallel with the plane defined by such rear wall portions. The movable back wall portion 40 sealingly engages at its upper and side margins 49a with an elastomeric balloon-type seal 43 (of known contruction) fastened along the edges of the fixed back wall portions 44, 46 and the lower edge of the upper wall portion 44 to provide a generally continuous, air draft-free back wall of the cab 50. Rear vision for the operator is provided by a centrally located window 42 carried by the movable back wall portion 40.

To provide the heretofore noted sealing engagement between the movable back wall portion 40 and the hood 20, a hood seal 41 of rubber or other conformable material is interposed between the hood top 22 and the lower central edge of the movable rear wall portion 40.

Figure 2:
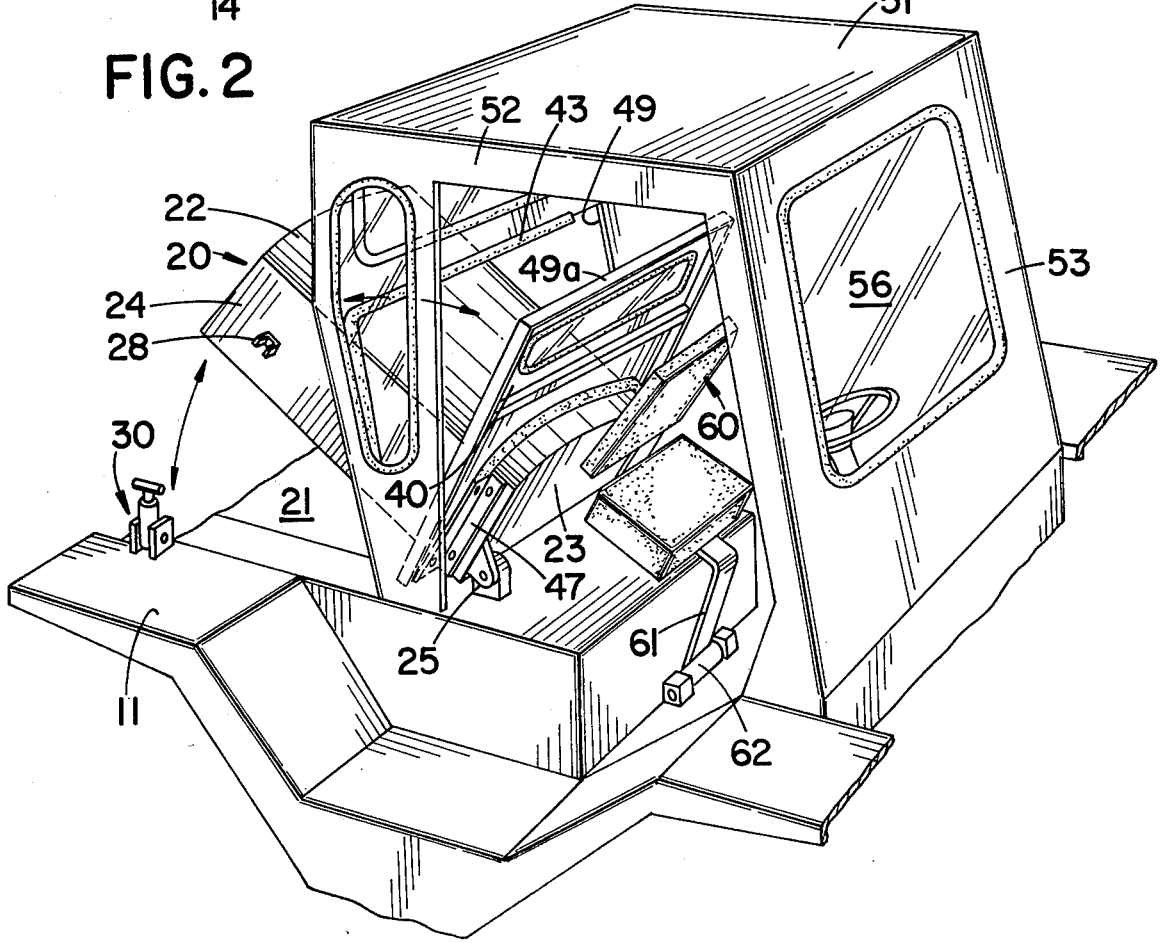
FIG. 2 is a front, right side, perspective view of the operator's cab illustrated in FIG. 1, with portions deleted, the rear engine hood of the associated lift truck being illustrated in a raised or open condition.

Turning to FIG. 2, the operator's cab 50, with the hinged door 54 removed for illustrative purposes, can be more clearly seen to include a top panel 51 and a front wall or panel 53 having a centrally located front window 56. The front wall 53 abuts the forward edges of the sidewalls 52, while the top panel 51 abuts the top edges of the side panels 52, the front panel 53, and the fixed rear wall upper portion 44. It can be seen that the top panel 51, the front panel 53, the side panels 52, and the back wall comprising fixed back wall portions 44, 46 and movable back wall portion 40 define, in general, a cubical cab for fully enclosing the operator's station.

With particular reference to FIG. 2, the hood 20 is shown in a raised or open condition wherein access is provided to an underlying engine compartment 21. The cubical area defined by the cab walls contains an operator's seat 60 supported on the upward end of a pedestal 61, pivotal on a trunnion-like hinge 62 on which the seat is movable between an operator's seating position and a forward position as illustrated in FIG. 2. The hood 20 can be seen to provide a hinged forward end 23 which extends into the cab interior forward of the movable back wall portion 40, the hinged end 23 being rearward of the front wall 53. The forward hood end 23 is mounted to the body 10, for example, by a pair of pin joint hinges 25 located at the lower corners of the hinged forward end.

As illustrated by FIG. 2, and in accordance with the invention, raising of the hood 20 for access to the engine compartment 21 swings the movable back wall portion 40 into the cab interior, the back wall portion 40 separating from the fixed rear wall portions 44, 46, and the hood pivoting about an axis provided by the pin joints 25. The axis provided by the pin joints 25 is generally perpendicular to the sidewalls 52 of the cab 50, ideally horizontal and transverse to the vehicle's longitudinal axis whereby the movable back wall portion 40, on swinging into the cab interior is in a perpendicular relationship with the sidewalls 52. The movable back wall portion 40 is fixed relative to the hood 20 by a pair of angle-iron brackets 47 (only one shown in FIG. 2) bolted respectively to the hood sidewalls 24 and the lower end of the movable back wall portion 40. The movable back wall portion 40 is slightly larger in dimension than the aperture defined by the associated edges of the wall portions 44, 46, wherein lowering of the hood 20 holds the back wall portion 40 in sealing engagement against the seal 43.

It can be seen that the rear wall of the cab is spaced well behind the operator's seat when the hood 20 is in a closed position. Upon opening of the hood 20, the movable portion 40 of the wall swings into the cab interior to permit full raising of the hood 20.

With reference to FIG. 5, with the hood 20 in its closed position, the rearward surface of the back wall portion 40 at the peripheral edge 49a is held against the seal 43, which is intermediate the area adjacent the edge 49a and the inward surface of the fixed rear wall portions 44, 46. Preferably, the balloon seal 43 includes an extruded channel which snaps over the edges of the wall portions 44, 46, as illustrated. The hood 20, when latched in its closed position, forces to a predetermined degree the edge area 49a of the back wall portion 40 against the seal 43 and compresses it to provide a generally draft-free fit.

Turning to FIG. 4, the movable back wall portion 40 is shown with its angle-iron brackets 47. The edge 49a of the back wall portion 40 can be seen to be a flanged edge, such flanging providing mechanical strength. The back wall portion 40 further provides the hood seal 41 fixed thereto in any convenient manner, such as by bolts. It can be seen that the back wall portion 40 is readily provided for mounting to the forward end of the hood 20, as earlier illustrated, such as by means of bolts assembled through holes in the angle brackets and suitable holes drilled into the hood 20.

Although the preferred embodiment of this invention has been shown and described, it should be understood that various modifications and rearrangements of the parts may be resorted to without departing from the scope of the invention as disclosed and claimed herein.

What is claimed is:

1. In a rear engine lift truck having a wheel-supported body with a rearwardly located engine compartment enclosed in part by an upwardly movable hood hinge mounted at its forward end to the body, an operator cab mounted on top of the body comprising:
    a front panel, a pair of side panels, and a top panel, at least one of the side panels providing door means for operator access and egress; and
    a back panel having a portion fixed relative to the front, side and top panels, and a movable portion fixed to the movable hood, the panels collectively defining a generally cubical cab interior, the hinged forward end of the hood extending into the cab interior, the movable portion of the back panel being swingable into the cab interior and separable from the fixed portion of the back panel when the hood is raised upwardly for pivotal movement about its hinged forward end.

2. A cab according to claim 1, wherein the fixed and movable portions of the back panel each provide peripheral edge areas sealingly engageable in abutting relationship with each other when the movable hood is in a closed position.

3. A cab according to claim 2, wherein at least one of the peripheral edges includes an elastomeric seal means.

4. A cab according to claim 1, wherein the movable portion of the back panel is generally perpendicular to the side panels when the movable hood is in a raised position.

5. In a rear engine lift truck having a wheel-supported body with a rearwardly located engine compartment enclosed in part by an upwardly movable hood hinge mounted at its forward end to the body, an operator cab mounted on top of the body comprising:
    a generally vertically extending front wall having a centrally located transparent windshield area;
    a pair of parallel, generally vertically extending sidewalls connected at their front edges to the front wall and extending rearwardly from the front wall, each of the sidewalls including movable window-providing door panels for operator access and egress;
    a generally horizontal top panel abutting and connected to the top edges of the front and sidewalls; and
    a generally vertically extending back wall generally parallel to the front wall and having its side edges and top edge connected respectively to the side walls and top panel to define a generally cubical cub cab interior, the back wall including a centrally located movable portion fixed and mounted to the hood, the hood havings its hinged end rotatable on an axis forward of the back wall and rearward of the front wall, the axis being perpendicular to the side walls, the movable portion of the back wall being revolvable about the axis when the hood is raised upwardly for pivotal movement about its hinged forward end with the movable portion of the back wall swinging into the cab interior.

6. A cab according to claim 5, wherein a peripheral edge provided by the movable portion of the back wall is spaced by a predetermined distance from and is immediately adjacent to a peripheral edge provided by a fixed portion of the back wall, the cab further including a deformable elastomeric seal interposed between and sealingly engaged with the peripheral edges.

7. A cab according to claim 6, wherein the deformable elastomeric seal is mounted to the peripheral edge of the fixed portion of the back wall.

8. A rear engine lift truck comprising:
a wheel-supported body having a front end, and a rear end providing an upwardly opening engine compartment;
a normally horizontally extending movable hood for closing the upwardly opening engine compartment, the hood being hinged to the body for upward pivotal movement;
a generally cubical panel-formed vehicle cab mounted on top of the wheel-supported body and extending at least partially over the forward end of the movable hood, the cab including a movable back wall portion mounted to the hood, the movable back wall portion being constructed and arranged to swing into the interior of the cab when the hood is raised upwardly for access to the engine compartment.

* * * * *